P. S. LARSON.
DEMOUNTABLE RIM FOR VEHICLE WHEELS.
APPLICATION FILED FEB. 9, 1917.
1,248,350. Patented Nov. 27, 1917.
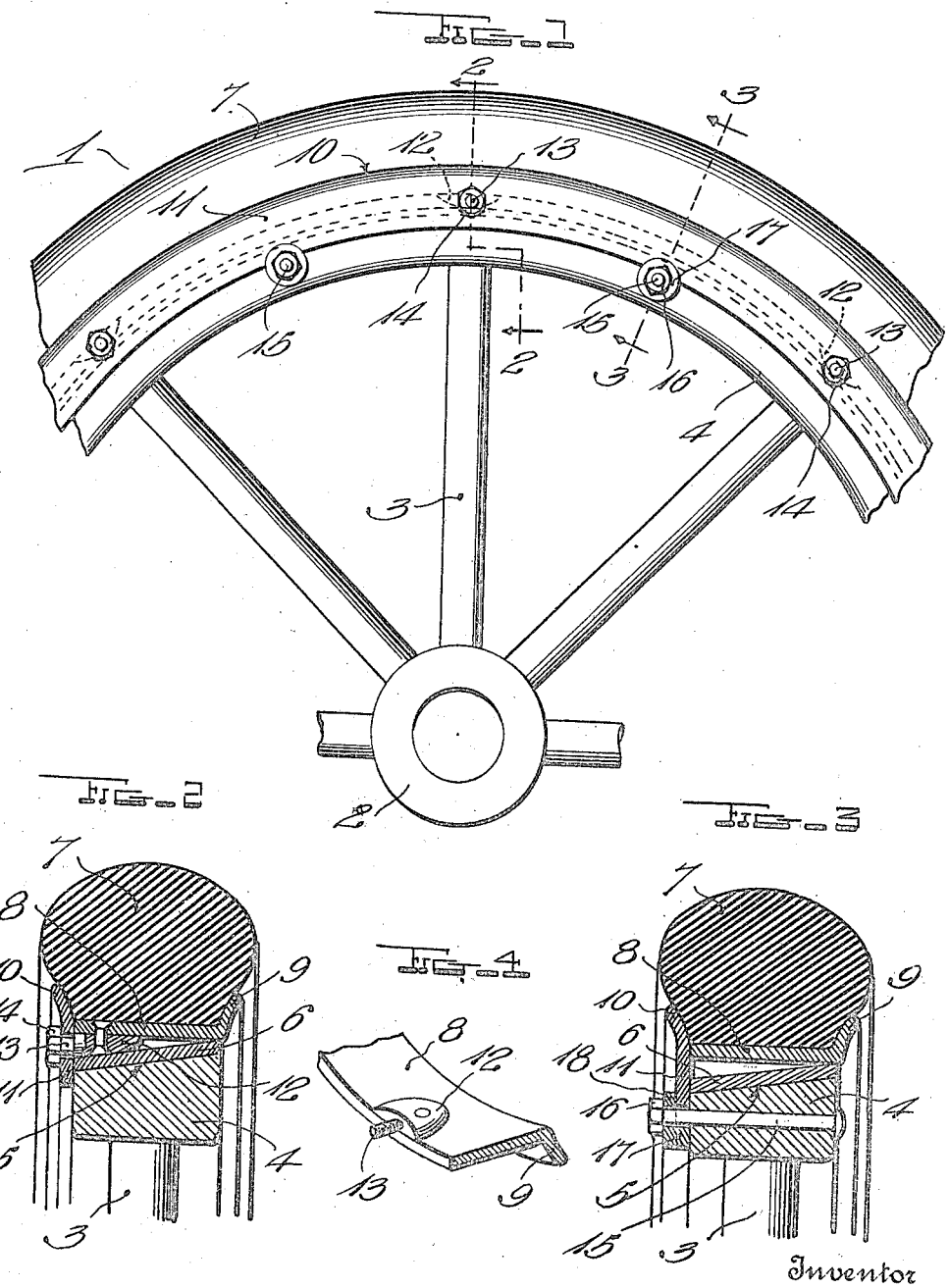
Inventor
Peter S. Larson

UNITED STATES PATENT OFFICE.

PETER S. LARSON, OF BELOIT, WISCONSIN.

DEMOUNTABLE RIM FOR VEHICLE-WHEELS.

1,248,350.  Specification of Letters Patent.  Patented Nov. 27, 1917.

Application filed February 9, 1917. Serial No. 147,657.

*To all whom it may concern:*

Be it known that I, PETER S. LARSON, a citizen of the United States, residing at Beloit, in the county of Rock and State of Wisconsin, have invented certain new and useful Improvements in Demountable Rims for Vehicle-Wheels; and I do declare the following to be a full, clear, and exact description of the invention, such as will enable others skilled in the art to which it appertains to make and use the same.

This invention relates to improvements in vehicle wheels, particularly demountable rims for automobile wheels.

The principal object of the invention is to produce a simply constructed combination separable and demountable rim for ordinary pneumatic tires of either the clencher or straight side type.

An additional object is to provide means for holding the improved rim upon the felly of the wheel.

With these and several other objects in view, the invention resides in the novel features of construction, combination and arrangement of parts which will be hereinafter more particularly set forth and shown in the accompanying drawing wherein:

Figure 1 represents a side elevation of a portion of an automobile wheel having a rim constructed in accordance with my invention;

Figs. 2 and 3 are transverse sections taken respectively on the planes of the lines 2—2 and 3—3 of Fig. 1.

Fig. 4 is a detail perspective view of a portion of the rim.

Referring more particularly to the several figures of the drawing, wherein similar reference characters indicate like parts, 1 denotes a wheel formed of a hub 2 of ordinary construction from which spokes 3 radially extend, the latter being connected together by a wooden felly 4. These parts are made of any preferred material and with sufficient strength to support the weight of an automobile or other vehicle as the case may be.

The peripheral face 5 of the felly 4 is inclined from one side to the other, preferably being inclined upwardly from the outer to the inner side, and is provided with a metallic band 6, the outer face of which is also inclined in a direction similar to the inclination of the face of the felly. The opposite edges of this band 6 coincide with the sides of the felly as shown. The demountable rim which is to be disposed on the band 6 may be constructed so as to receive either a straight side tire or one of those known as a clencher tire. In the present instance a straightside tire 7 is shown applied.

The rim comprises an annular band 8 to surround the felly of the wheel, and radial flanges for engaging the sides of the tire. One of these flanges 9 is formed integrally with one edge of the band 8, preferably the inner edge thereof, while the other flange 10 extends from an annular plate 11 which engages the outer edge of the band 8. It will be noted that in cross section the band 8 is flat, and the space between the outer edge of this band and the outer edge of the inclined band 6 is occupied by a number of wedge-shaped members 12 which are riveted or otherwise secured to the outer band 8.

The wedge members 12 are spaced predetermined distances apart around the inner face of the band 8, and each has an outwardly extending threaded stud 13 formed integrally therewith, said studs being adapted to receive the nuts 14. The annular plate 11 has a plurality of apertures to receive the outwardly extending studs 13, and when this plate is in position on said studs and the nuts 14 tightened, the tire 7 will be effectively held to the rim. Under such circumstances, the annular plate 11 engages the outer ends of the wedge members 12 and the outer edge of the band 8. By this arrangement a tire may be readily placed on the demountable rim when the same is removed from the wheel and the annular plate 11 has been detached.

The rim together with its tire is held to the felly of the wheel by means of a plurality of spaced bolts 15 which extends transversely through the felly adjacent the inner edge of the plate 11 when the rim is in position. These bolts are secured against rotation in the felly and have their outer ends threaded to receive the nuts 16, which when they are tightened force the wedge members 12 into engagement with the inclined face of the band 6, and thus secure the rim to the wheel. Since the annular plate 11 is extended beyond the outer side of the felly as shown in Figs. 2 and 3, washers 17 are preferably interposed between the nuts 16 and the portion of the plate adjacent the bolts 15. Each of these washers has its inner face cut away as shown at 18 to form a shoulder which engages the inner edge of the plate 11, the cut away portion receiving the inner edge portion of said plate. It will be seen that as the nuts 16 are tightened, the engagement thereof with the washers 17 will cause the rim to be moved inwardly and the wedge members 12 frictionally engage with the face of the band on the felly.

It will be obvious that with such a rim as above described, the tire 7 may be placed in position thereon whether or not the same is removed from the wheel. In other words by removing the nuts 14 and 16, and disengaging the annular plate 11 from the studs 13 the other portions of the rim will remain on the wheel and the tire may be readily placed in position; or the nuts 16 may be alone removed and the entire rim detached from the wheel so that a tire can be placed thereon at the leisure of the operator.

I claim:

A demountable rim comprising an annular band having a radial tire engaging flange on one edge, a plurality of wedge members having outwardly extending threaded studs secured to the inner surface of said band at its other edge, said wedge members having inclined faces adapted to engage the wheel body, an annular plate having a tire engaging portion, said plate being provided with a series of apertures to receive said threaded studs and nuts on said studs for engaging said plate.

In testimony whereof I have hereunto set my hand in the presence of two subscribing witnesses.

PETER S. LARSON.

Witnesses:
  T. D. WOOLSEY,
  M. A. TIFFANY.

Copies of this patent may be obtained for five cents each, by addressing the "Commissioner of Patents, Washington, D. C."